Nov. 9, 1943.  V. O. BEAM  2,333,913
VALVE MECHANISM
Filed July 11, 1942
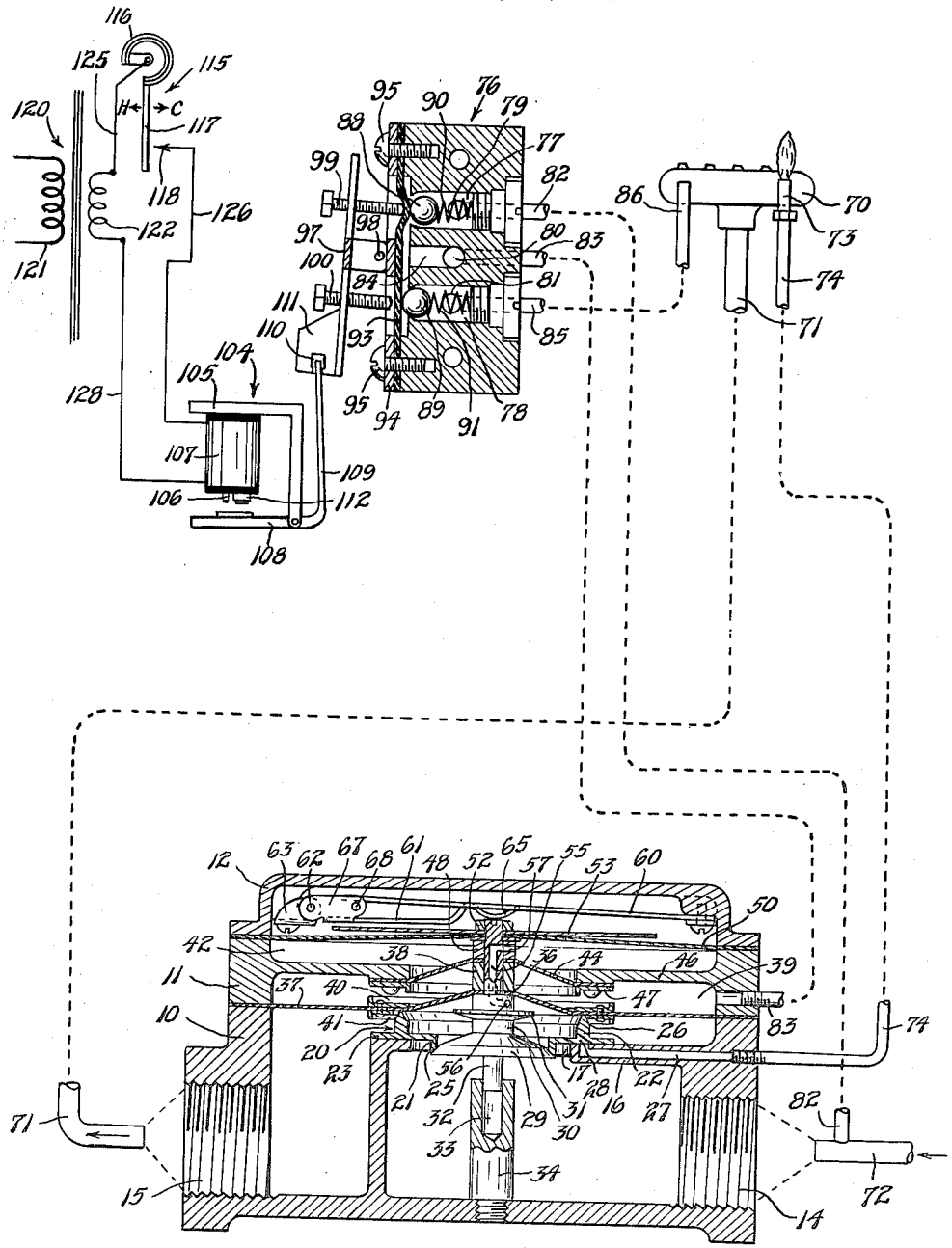
INVENTOR.
VILYNN O. BEAM
BY George H. Fisher
ATTORNEY.

Patented Nov. 9, 1943

2,333,913

UNITED STATES PATENT OFFICE 2,333,913

VALVE MECHANISM

Vilynn O. Beam, Minneapolis, Minn., assignor to Minneapolis-Honeywell Regulator Company, Minneapolis, Minn., a corporation of Delaware Application July 11, 1942, Serial No. 450,614

10 Claims. (Cl. 137—153)

The present invention is concerned with a valve mechanism and more particularly with one functioning both as a pressure regulating and as a shut-off valve.

An object of the present invention is to provide a combined pressure regulating and shut-off valve in which the pressure regulator is controlled in accordance with the pressure existing between the shut-off valve and the pressure regulating valve.

A further object of the present invention is to provided a combined pressure regulating and shut-off valve in which the shut-off valve is located on the down-stream side of the pressure regulating valve and in which the position of the pressure regulating valve is controlled in accordance with the pressure existing between the shut-off valve and the pressure regulating valve.

A further object of the present invention is to provide a pressure regulating and shut-off valve of the type discussed in which the various valve elements are positioned by diaphragms forming the walls of pressure chambers.

A further object of the present invention is to provide such a combined pressure regulating and shut-off valve in which the pressure regulating valve and the pressure chamber for actuating the pressure regulating valve are located on opposite sides of the pressure chamber for positioning the shut-off valve.

A further object of the present invention is to provide an arrangement such as set forth in the last object in which the chamber between the pressure regulating and shut-off valves is connected to the chamber controlling the position of the pressure regulating valve by a passage extending through the valve stem.

A further object of the present invention is to provide a pressure regulating valve in which the pressure in the pressure chamber is unaffected by turbulent or Venturi effects in the fluid flowing through the valve.

A further object of the invention is to provide a combined pressure regulating and shut-off valve for a fluid fuel burner in which provision is made for supplying fluid fuel to a pilot burner at a substantially constant pressure.

A further object of the invention is to provide a relatively compact diaphragm valve with biasing means capable of exerting a relatively uniform bias on the diaphragm throughout its range of movement.

Other objects of this present invention will be apparent from a consideration of the accompanying specification, claims and drawing, of which the single figure is a schematic showing of a gas burner control system employing my improved pressure regulating and shut-off valve, the valve being shown in section.

Referring to the lower portion of the drawing, my improved valve mechanism includes a housing having three sections. The lower section is designated by the reference numeral 10, the intermediate section by the reference numeral 11, and the top or cover section by the reference numeral 12. The lower section 10 constitutes a valve casing having the usual inlet connection 14 and outlet connection 15. Extending between the inlet and outlet connections 14 and 15 is a partition wall 16 having an opening 17 therethrough. A valve seat member 20 is secured to the partition wall 16. This valve seat member comprises a cylindrical section 21 of relatively small diameter and a cylindrical section 22 of larger diameter. These two sections are joined by a flange 23 which rests upon and is secured to the partition wall 16. The lower end of the cylindrical portion 21 terminates in a valve seat 25 and the upper end of the cylindrical portion 22 in a valve seat 26. A passage 27 extends through wall 16 and communicates with a passage 28 extending through the valve seat member 20 between valve seats 25 and 26.

A pressure regulator valve disk 29 is adapted to cooperate with the valve seat 25. The throttling valve disk 29 is secured to a stem 30. Also secured to this stem 30 above the valve disk 29 is a baffle disk 31, the function of which will be explained later.

Extending downwardly from valve disk 29 is a guide stem 32. This guide stem is adapted to slide up and down within a cylindrical recess 33 of a stud 34, the lower end of which is screw-threadedly secured to the valve casing 10.

The stem 30 is reduced at its upper portion to form a shoulder 36. The central portion of a diaphragm 37 is provided with an opening having the same diameter as the diameter of the reduced upper portion of stem 30. This reduced upper portion extends through the diaphragm and a collar 38 is secured over this reduced portion. The central portion of the diaphragm 37 is thus clamped between the shoulder 36 and the collar 38. The outer edge of the diaphragm is secured between housing sections 10 and 11. A pair of valve rings 40 and 41 are secured to the opposite sides of the diaphragm 37 so as to form with the diaphragm a main valve disk adapted to cooperate with the valve seat 26.

A second diaphragm 44 is clamped at its outer edge between an inwardly extending annular wall member 46 projecting inwardly from the intermediate housing section 11 and a clamping ring 47. The central portion of diaphragm 44 is provided with an opening, also of the same diameter as the reduced upper portion of stem 30. This reduced upper portion extends through this opening and a further collar 48 is secured on the reduced upper portion engaging the top of diaphragm 44. The central portion of diaphragm 44 is thus secured between collars 38 and 48.

A third diaphragm 50 is clamped at its outer edge between housing sections 11 and 12. The central portion of this diaphragm 50 is apertured and extends over the upper end of stem 30. The extreme upper end of the stem 30 is threaded and a nut 52 is threadedly engaged therewith. A backing disk 53 is disposed between the nut and diaphragm 50. The nut 52 serves to clamp the central portions of diaphragms 37, 44 and 50 in position between the shoulder 36, and collars 38 and 48, respectively.

Diaphragm 37, as was previously noted, forms with the valve rings 40 and 41 the main valve disk. This diaphragm likewise serves to determine the position of this disk. It will be noted that the diaphragm 37 forms a lower wall of a pressure chamber 39 bounded on the upper side by the annular wall 46 and diaphragm 44. Diaphragm 44, because of its relatively small diameter, plays little part in the positioning of the valve members. Its function, primarily, is to act as a seal-off diaphragm to permit a limited movement of the valve 30 while preventing the passage of gas therethrough.

The upper diaphragm 50 forms the upper wall of a second pressure chamber 42, the lower wall of which is the annular wall member 46 and the diaphragm 44. The pressure chamber 42 functions to determine the position of the pressure regulating valve disk 29.

A passage 55 extends through the reduced upper end of stem 30. This passage terminates at its lower end in an opening 56 below diaphragm 37. In other words, this opening 56 is between the pressure regulating valve disk 29 and the shut-off valve. At its upper end, the passage 55 connects with a passage 57 extending transversely through the collar 48. The passage 55 thus connects at its upper end with the pressure chamber 42 and serves to connect the pressure chamber 42 with the space between the shut-off and pressure regulating valve and to maintain within the pressure chamber this pressure between the two valves.

A leaf spring 60 is secured at its right-hand end to the under side of the top housing section 12. A lever arm 61 is pivotally secured at 62 to a bracket 63. The right-hand end of lever arm 61 is provided with a curved portion 65 adapted to bear against the upper end of stem 30. The leaf spring 60 is slotted adjacent its left-hand end to permit the right-hand end of lever 61 to move therethrough. The left-hand end of lever 61 which is pivotally secured to the bracket 63 has a pair of upstanding legs 67 which straddle the bracket 63. Extending between these two legs is a pin 68. The left-hand end of leaf spring 60 extends between these two legs and engages the pin 68 to bias lever 61 in a clockwise direction and hence bias valve stem 30 downwardly.

The valve assembly which has just been described is employed to control the flow of gas to a main burner 70. This burner is connected to the outlet 15 of the valve assembly by a pipe 71, only a portion of which has been shown in order to simplify the drawing. The inlet 14 of the valve assembly is connected to a gas supply pipe 72 leading to any suitable source of supply (not shown). Associated with the main burner 70 is a pilot burner 73 which is connected to passage 27 by a pipe 74 and is hence supplied with gas through the pressure regulating valve 29 and passages 28 and 27. As is customary, the pilot burner 73 is employed to ignite the main burner 70 and is normally constantly burning.

The gas pressure within the chamber bounded by diaphragm 37 is controlled by means of a pilot valve generally indicated by the reference numeral 76. This pilot valve and its operating mechanism is illustrated in greater detail in the copending application of Daniel G. Taylor, Serial No. 390,553, filed April 26, 1941. Reference is made to that application for a detailed understanding of the pilot valve. As shown in the drawing of this application, this pilot valve comprises a housing 76 having a pair of valve chambers 77 and 78. The valve housing 76 is provided with three openings 79, 80 and 81. Opening 79 opens into the chamber 77 and connects at its outer end with a pipe 82 extending to the gas supply pipe 72. The chamber 77 thus constitutes the inlet chamber of the valve mechanism.

The passage 80 connects with a pipe 83 connected to the first chamber bounded on its lower side by diaphragm 37. The inner end of opening 80 is connected to a chamber 84 which is adapted to be placed in communication with either chamber 77 or chamber 78.

Opening 81 which connects with chamber 78 is connected with a pipe 85 which leads to a bleed burner 86 for burning the waste gas. Thus, the chamber 78 constitutes the outlet chamber of the valve mechanism.

Each of the chambers 77 and 78 has an inturned portion at its outer end to form a valve seat. A ball valve 88 is located within chamber 77 and a ball valve 89 in chamber 78. Springs 90 and 91 are located within chambers 77 and 78, respectively, and serve to bias the ball valves outwardly against their seats. When ball valve 88 is moved to open position, communication is established between opening 79 and opening 80 leading to the first pressure chamber. When, on the other hand, valve 88 is against the seat and valve 89 is away from the seat, communication is established between opening 80 and opening 81 leading to the bleed burner 86.

The chamber 84 is sealed from the atmosphere by a diaphragm 93 which is suitably clamped to the pilot valve assembly by any suitable means such as a frame 94 and screws 95. A rocker 97 is tiltably secured to the frame 94 at 98. The rocker carries adjustable screws 99 and 100 whose stems extend inwardly toward the pilot valve assembly and engage the diaphragm 93 through openings in the frame 94 for actuating the ball valves 88 and 89. The rocker 97 and actuating screws 99 and 100 are so arranged that when the rocker assumes the mid position, both of the valves 88 and 89 are closed so that the pressure within the pressure chamber 39 remains at a constant value. When the rocker 97 is rotated slightly in a clockwise direction from mid position to the position shown in the drawing, actuating screw 99 forces the ball valve 88 away from its seat, at which time gas can pass from the inlet chamber 77 to chamber 84. When the rocker 97 is rotated in a counter-clockwise position, it permits the biasing spring 90 to move ball valve 88 against the seat. At the same time, ball valve 89 is forced away from its seat to establish communication between chambers 84 and 78.

The rocker 97 is adapted to be actuated automatically by means of an electromagnet 104. This electromagnet may be of any suitable type but is shown schematically as comprising an L-shaped magnetic frame element 105. Secured to one leg of the L-shaped core member is a core post 106 around which a winding 107 is located. Pivotally secured to the lower end of the other leg of the inverted L-shaped element 105 is an armature member 108 which is designed to cooperate with the core member 105. Upon energization of the winding 107, the armature member 108 is rotated in clockwise direction into engagement with the end of the core post 106. As is common with A. C. operated devices, the end of the post 106 engaged by the armature 108 is provided with a shading ring 112 to shade a portion of the flux and hence decrease chattering of the relay. The right-hand end of armature 108 is provided with an upstanding arm 109 adapted to extend into a slot 110 of an ear 111 carried by the rocker 97. Upon energization of winding 107 to rotate armature 108 in a clockwise direction, the resultant clockwise movement of arm 109 causes a counterclockwise movement of rocker 97 to in turn cause closure of valve 88 and opening of valve 89, all as previously described.

A room thermostat 115 is employed to control the energization of winding 107 and hence the operation of pilot valve 76. This thermostat is of conventional form and is shown as comprising a bimetallic element 116 to which is secured a contact arm 117. The contact arm is designed to cooperate with a fixed contact 118. As shown by the legend adjacent the contact arm 117, the bimetallic element 116 is so arranged that upon a drop in temperature, the contact arm 117 is moved towards the right into engagement with contact 118. Upon a rise in temperature on the other hand, the contact arm 117 is moved to the left away from contact 118.

A step-down transformer 120 is employed for supplying power to the control system. This transformer comprises a line voltage primary 121 and a low voltage secondary 122. The line voltage primary 121 is connected to any suitable source of power (not shown).

Operation

The various elements are shown in the position which they assume when there is no demand for burner operation. Under these conditions, the pilot burner 73 is ignited as it always is under normal conditions. The ball valve 88 is off of its seat so that it is possible for gas to flow from gas supply pipe 72 through pipe 82, opening 79, chamber 77, chamber 84, and pipe 83 to the interior of chamber 39. The effect of this pressure within chamber 39 is to force diaphragm downwardly so as to cause the shut-off valve to be closed. In spite of the shut-off valve being closed, the pressure within chamber 42 will assume substantially the desired operating pressure. This is due to the fact that the shut-off valve is on the downstream side of the chamber to which chamber 42 is connected. Any tendency of the pressure in this chamber to decrease causes the pressure regulating valve 29 to move towards open position to in turn increase the pressure. If the pressure in the chamber increases, the opposite action will take place. Thus the pressure regulating valve functions in the normal manner to maintain a constant pressure in the chamber between the pressure regulating and shut-off valves.

Let it be assumed now that there is drop in temperature of the medium to which bimetallic element 116 responds. Under these conditions, contact arm 117 will be moved into engagement with contact 118 so that an energizing circuit will be established to the electromagnet winding 107 as follows: from the upper end of secondary 122 through conductor 125, bimetallic element 116, contact arm 117, contact 118, conductor 126, winding 107, and conductor 128 back to the other terminal of secondary 122. As a result of the establishment of this circuit, winding 107 is energized to cause armature 108 to rotate in a clockwise direction. As previously explained, such clockwise rotation of armature 108 causes counter-clockwise rotation of rocker 97 to cause closure of valve 88 and movement of valve 89 away from its seat. The closure of ball valve 88 prevents gas from flowing from inlet pipe 72 to the pressure chamber 39. The movement of ball valve 89 away from its seat permits gas flow from pressure chamber 39 to the bleed burner 86 through pipe 83, opening 80, chamber 84, chamber 78, opening 81, and pipe 85 to bleed burner 86. Because of the establishment of this connection between chamber 39 and bleed burner 86, the pressure within the chamber 39 approaches atmospheric pressure. As previously explained, the pressure immediately above the pressure regulating valve 29 is normally at the desired operating pressure. The result is that as soon as the pressure above diaphragm 39 is allowed to bleed off, the pressure beneath the central portion of diaphragm 37 is effective to move valve rings 40 and 41 away from the valve seat 26. As soon as these valve rings start to move away from the valve seat, gas is allowed to flow to the outlet chamber and increase the pressure therein. The increased pressure on the underside of diaphragm 37 causes the main valve to move quickly to full open position.

As soon as the main valve is opened, the pressure within the chamber between the pressure regulating valve 29 and the main valve tends to drop to a value more nearly that of the outlet pressure. As a result, the pressure communicated through openings 55 and 57 to chamber 42 likewise tends to drop so that the biasing means comprising spring 60 and lever 61 is able to move the stem 30 downwardly to move pressure regulating valve 29 to a more nearly open position and hence to restore the pressure to the desired value. Any further tendency for the outlet pressure to decrease will cause a reduction of the pressure within chamber 42 to cause valve 29 to move even further towards full open position. This, in turn, will permit more gas to flow through the two valves in series and hence to restore the outlet pressure to the desired value. Thus, the device will continue to function as a pressure regulator in the normal manner.

The baffle 31, being located between the pressure regulating valve and the inlet 56 to passage 55, serves to prevent the pressure transmitted through passage 55 from being affected by any turbulent or Venturi effects that might be present in the space between the pressure regulating and shut-off valves. Because of the baffle 31, opening 56 is in a pocket which is subjected only to the static pressure between the valves.

It is to be noted when the shut-off valve first opens, the pressure regulator valve 29 is in closed position. The effect of this is that when the shut-off valve initially opens, the flow of gas will be relatively small until the pressure regulating valve has moved to open position also. This is highly desirable where a burner is located in a relatively small combustion chamber. In such a case, if the gas is initially admitted at too great a rate, the pilot burner is incapable of completely igniting the gas before much of the combustion chamber has been filled with gas. The result is that the lighting of the gas is accompanied by a concussion which may often be of considerable magnitude. By having the pressure regulator valve respond to the pressure on the upstream side of the shut-off valve rather than the downstream side of the shut-off valve, as is usually the case with combined pressure regulator and cut-off assemblies, this advantage of having the pressure regulating valve initially closed is obtained.

It is to be noted that the pilot burner is supplied with gas from the chamber between the pressure regulating and shut-off valves, within which the pressure is maintained constant. Hence the pilot burner is supplied at all times with gas at a substantially constant pressure.

The valve will continue to operate in the manner described until the temperature to which bimetallic element 116 is subjected rises sufficiently high to cause separation of contact arm 117 from contact 118. When this happens, winding 107 is deenergized so that armature 108 drops away from the core. If desired, some biasing means may be associated with the armature 108 to facilitate this action. In any event, the armature 108, the arm 109, and the rocker 97 move to the position shown in the drawing. The connection between the chamber 39 and bleed burner 85 is thus interrupted and the connection between the supply pipe and chamber 39 is reestablished. As a result, pressure chamber 39 is again subjected to the pressure of the supply pipe so that the shut-off valve assumes the position shown in the drawing. This causes the connection between the outlet chamber and the space between the shut-off valve and the pressure regulating valve disk 29 to be interrupted so that this space tends to assume a pressure substantially the same as the inlet chamber pressure.

It will be seen that I have provided an extremely compact combined pressure regulating and shut-off valve in which the pressure regulating valve is disposed on the upstream side of the shut-off valve. By disposing the parts in the manner described and hereinafter claimed, it is possible to have the diaphragm of the main pressure chamber 39 act both as a valve of the pressure motor and also as a main diaphragm itself, and at the same time provide for the pressure regulating valve being on the upstream side of the shut-off valve. By utilizing the spring mechanism consisting of spring 60 and lever 61, it is possible to make the top member relatively shallow and still have a relatively uniform bias exerted upon the stem 30 throughout its entire range of movement.

While I have shown a specific embodiment of my invention, it is to be understood that this is for purposes of illustration only and the scope of the invention is limited only by the appended claims.

I claim as my invention:

1. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm secured to said pressure regulating valve, a second pressure chamber having said second diaphragm as a movable wall thereof, means for varying the pressure within said first pressure chamber to cause said shut-off valve member to move between open and closed positions, and a fluid connection between said second chamber and that portion of the valve housing between said pressure regulating and shut-off valves.

2. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member concentrically therewith, a first pressure chamber having said first diaphragm as a movable wall thereof, a second diaphragm concentrically disposed with respect to said first diaphragm and secured to said pressure regulating valve, a second pressure chamber having said second diaphragm as a movable wall thereof, means for varying the pressure within said first pressure chamber to cause said shut-off valve member to move between open and closed positions, and a fluid connection between said second chamber and that portion of the valve housing between said pressure regulating and shut-off valves.

3. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm, a valve stem projecting from said pressure regulating valve through said first diaphragm and secured to said second diaphragm, a second pressure chamber having said second diaphragm as a movable wall thereof, means for varying the pressure within said first pressure chamber to cause said shut-off valve member to move between open and closed positions, and a passage through said valve stem extending between said second chamber and that portion of the valve housing between said pressure regulating and shut-off valves.

4. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member concentrically therewith, a first pressure chamber having said first diaphragm as a movable wall thereof, a second diaphragm concentrically disposed with respect to said first diaphragm, a valve stem projecting from said pressure regulating valve through the center of said first diaphragm and secured to said second diaphragm, a second pressure chamber having said second diaphragm as a movable wall thereof, means for varying the pressure within said first pressure chamber to cause said shut-off valve member to move between open and closed positions, and a passage through said valve stem extending between said second chamber and that portion of the valve housing between said pressure regulating and shut-off valves.

5. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm secured to said pressure regulating valve, a second pressure chamber having said second diaphragm as a movable wall thereof, means including a three-way pilot valve operative in one position to admit inlet pressure to said first pressure chamber to cause said shut-off valve member to move to closed position and in another position to permit the fluid within said first pressure chamber to escape to cause said shut-off valve to move to open position, and a fluid connection between said second chamber and that portion of the valve housing between said pressure regulating and shut-off valves.

6. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm secured to said pressure regulating valve, a second pressure chamber having said second diaphragm as a movable wall thereof, means for varying the pressure within said first pressure chamber to cause said shut-off valve member to move between open and closed positions, a fluid connection between said second chamber and that portion of the valve housing between said pressure regulating and shut-off valves, and a baffle disposed in said last mentioned portion of the valve housing adjacent one end of said passage.

7. A pressure regulating valve comprising a valve housing having an inlet and an outlet, a pressure regulating valve disposed in said valve housing, a valve stem secured to said valve, means biasing said valve to valve open position, a diaphragm secured to said valve stem, a pressure chamber including said diaphragm as a movable wall, said valve stem being provided with a passage extending from a portion of said housing on the outlet side of said pressure regulating valve into said pressure chamber, and a baffle disk carried by said valve stem parallel to said valve adjacent the inlet to said passage and between said valve and inlet to said passage in such a position that the pressure within said passage is not affected by the rate of flow of gas through the valve.

8. In a diaphragm valve, a housing assembly comprising relatively shallow valve casing and cover sections, said valve casing section having an inlet and an outlet, a valve member disposed in said valve casing section, a diaphragm secured to said housing assembly and to said valve member to position said valve member, a leaf spring secured inside of said cover section and extending substantially entirely across said cover section, a lever pivotally secured inside of said cover section and having a portion adjacent its pivot point engaging said leaf spring, and means operatively connecting the free end of said lever and said valve member so that said valve member is biased in one direction by said leaf spring.

9. In a diaphragm valve, a housing assembly comprising relatively shallow valve casing, intermediate, and housing sections, said valve casing section having an inlet and an outlet, a valve member disposed in said valve casing section, a valve stem secured to said valve member and extending through said intermediate section into said top section, a diaphragm secured between said top section and said intermediate section and connected at its center to said valve stem, means forming a pressure chamber including said diaphragm as a movable wall, means for varying the pressure in said chamber, a leaf spring secured inside of said cover section and extending substantially entirely across said cover section, and a lever pivotally secured inside of said cover section and having a portion adjacent its pivot point engaging said leaf spring, the free end of said lever engaging said valve stem so that said valve and valve stem are biased in one direction by said leaf spring.

10. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said diaphragm as a movable wall thereof, a second diaphragm secured to said pressure regulating valve, a second pressure chamber having said second diaphragm as a movable wall thereof, means for varying the pressure within said first pressure chamber to cause said shut-off valve member to move between open and closed positions, a fluid connection between said second chamber and that portion of the valve housing between said pressure regulating and shut-off valves, said housing being provided with a passage extending from said portion of the housing between said pressure regulator and shut-off valves to the exterior of the casing, and connecting means associated with the outer end of said passage for connecting said passage to a pilot burner.

VILYNN O. BEAM

DISCLAIMER 2,333,913.—*Vilynn O. Beam*, Minneapolis, Minn. VALVE MECHANISM. Patent dated November 9, 1943. Disclaimer filed July 17, 1944, by the assignee, *Minneapolis-Honeywell Regulator Company*.

Hereby enters this disclaimer to claims, 1, 2, and 5 of said specification.

[*Official Gazette August 8, 1944.*]